US008352404B2

(12) United States Patent
Guilbert et al.

(10) Patent No.: US 8,352,404 B2
(45) Date of Patent: Jan. 8, 2013

(54) CONTAINER VESSEL STOWAGE PLANNING

(75) Inventors: Nicolas Guilbert, Copenhagen (DK); Benoit Paquin, Hellerup (DK)

(73) Assignee: A.P. Moller-Maersk A/S, Copenhagen K (DK)

( * ) Notice: Subject to any disclaimer, the term of this patent is extended or adjusted under 35 U.S.C. 154(b) by 631 days.

(21) Appl. No.: 12/444,458

(22) PCT Filed: Oct. 3, 2007

(86) PCT No.: PCT/DK2007/000424
§ 371 (c)(1),
(2), (4) Date: Feb. 18, 2010

(87) PCT Pub. No.: WO2008/040351
PCT Pub. Date: Apr. 10, 2008

(65) Prior Publication Data
US 2010/0145501 A1 Jun. 10, 2010

Related U.S. Application Data

(60) Provisional application No. 60/850,680, filed on Oct. 10, 2006.

(30) Foreign Application Priority Data

Oct. 6, 2006 (EP) .................................... 06388057

(51) Int. Cl.
*G06N 5/00* (2006.01)
(52) U.S. Cl. .......................................... 706/48; 706/45
(58) Field of Classification Search ................. 706/48, 706/45
See application file for complete search history.

(56) References Cited

FOREIGN PATENT DOCUMENTS

WO WO 2006/000462 A1 1/2006
WO WO 97/35266 9/2007

OTHER PUBLICATIONS

Murty, Hongkong International Terminals Gains Elastic Capacity Using a Data-Intensive Decision-Support System, Interfaces 35(1), 2005, pp. 61-75.*
Meersmans, Optimization of Container Handling Systems, Thesis, University Rotterdam, 2002, pp. 1-174.*
Int'l Search Report for PCT Application No. PCT/DK/2007/000424, 2 pages, Feb. 6, 2008.
Stowage Planning in Maritime Container Transportation, J.G. Kang, Y.D. Kim, Journal of the Operational Research Society (2002), vol. 53, pp. 415-426.
A Decomposition Heuristics for the Container Ship Stowage Problem, Daniela Ambrosino, Anna Sciomachen, Elena Tanfani, J. Heuristics (2006), vol. 12, pp. 211-233.

(Continued)

*Primary Examiner* — Wilbert L Starks
(74) *Attorney, Agent, or Firm* — Brinks Hofer Gilson & Lione

(57) ABSTRACT

A computer-implemented method of determining an allocation plan for a cargo stowage problem of allocating a set of cargo items to a set of cargo item positions of a vessel, each cargo item position being suitable for receiving a cargo item. The method comprises constructing an expression indicative of one or more constraints to be satisfied by said allocation plan, constructing a cost function indicative of a cost of an updated allocation plan relative to a current allocation plan of said cargo stowage problem, iteratively updating a current allocation plan from an initial allocation plan to an updated allocation plan so as to decrease said cost function under said one or more constraints.

50 Claims, 7 Drawing Sheets

OTHER PUBLICATIONS

A Genetic Algorithm with a Compact Solution Encoding for the Container Ship Stowage Problem, Opher Dubrovsky, Gregory Levitin, Michal Penn, Journal of Heuristics, vol. 8, pp. 585-599, 2002.

Container Ship Stowage Problem: Complexity and Connection to the Coloring of Circle Graphs, Mordecai Avriel, Michal Penn, Naomi Shpirer, Discrete Applied Mathematics 103 (2000), pp. 271-279.

Principles of Combinatorial Optimization Applied to Container-Ship Stowage Planning, J.D. Wilson, P.A. Roach, Journal of Heuristics, vol. 5, pp. 403-418, (1999).

Stowage Container Planning: A Model for Getting an Optimal Solution, R.C. Botter, M.A. Brinati, Computer Applications in the Automation of Shipyard Operation and Ship Design, VII—C. Baraúna Vieira et al. (Eds.), Elsevier Science Publishers B.V. (North-Holland) © 1992 IFIP.

* cited by examiner

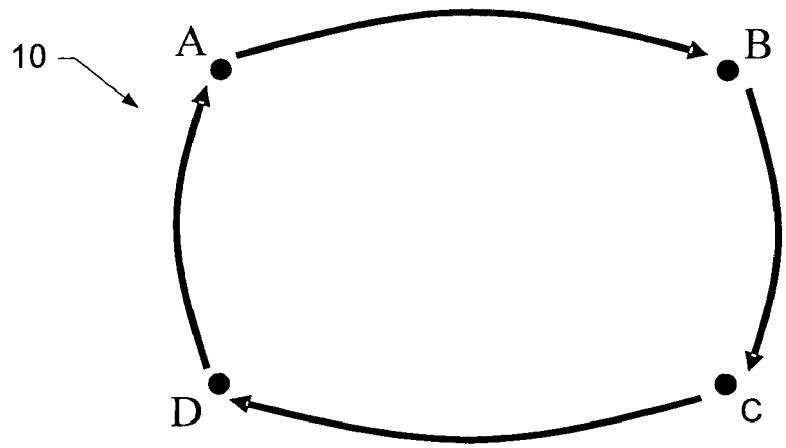
*Fig. 2*
```
    A  B  C  D
A   0  0  1  1
B   1  0  1  1
C   0  0  0  0
D   0  0  1  0
```
*Fig. 5*
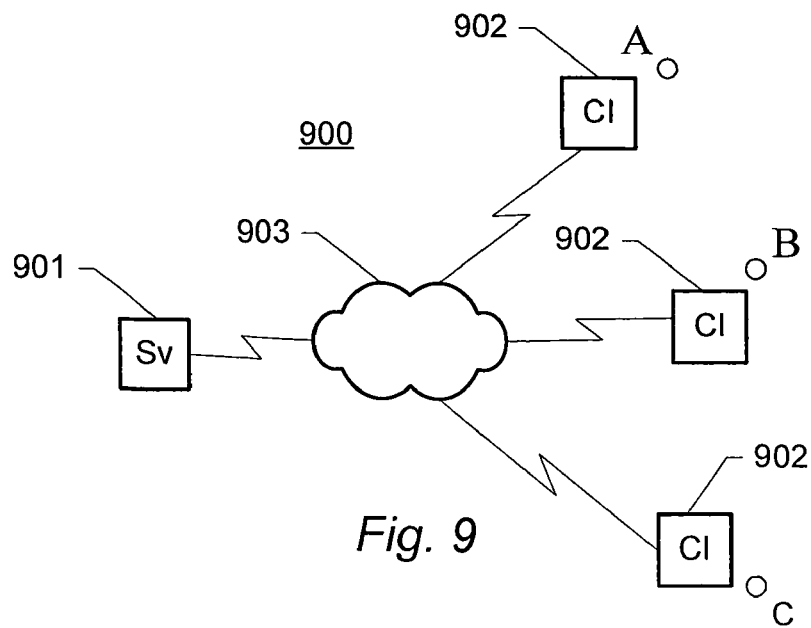
*Fig. 9*

CONTAINER VESSEL STOWAGE PLANNING

This application is a filing under 35 U.S.C. §371 of International Patent Application PCT/DK2007/000424, filed 3 Oct. 2007, and claims priority to European Patent Application No. 06 388 057.9, filed 6 Oct. 2006, and U.S. Provisional Patent Application No. 60/850,680, filed 10 Oct. 2006.

BACKGROUND

In modern container transport, a container vessel typically serves/calls a sequence of ports, typically a cyclic sequence of ports. Such a cyclic sequence of ports that a vessel calls will also be referred to as a string, and each voyage of the vessel is referred to as a round-trip (or rotation) through the ports.

A container vessel typically accepts containers at each port of call which are destined for respective ones of the other ports of call that the ship is due to visit. At each port of call, the vessel discharges all of the containers destined for that port and it loads all the containers which are destined for other ports of call which the ship is due to visit.

There are a large number of different types of containers that are transported by container vessels. Typically, standard containers are either 20' or 40' long, 8' wide, and 8'6" high. The capacity of a container vessel is normally measured in twenty feet equivalent units (TEU) or forty feet equivalent units (FEU). Non-standard containers include 45' containers that are 45' long, high-cube containers that are 9'6" high, and several types of pallet-wide containers that are a few centimetres wider to accommodate standard pallets inside. Moreover, reefer containers need power supply, out-of-gauge containers (OOG) may have cargo sticking out of one of the gates, and open-top containers may have cargo out of the top. Containers with dangerous goods are handled according to IMO rules that define legal ways to store these containers.

A container vessel typically includes a number of bays where single rows of 40' or 45' containers or double rows of 20' containers can be stacked in respective stacks. Typically, a number of hatch covers divide the bays into under and over deck positions. The levels of containers in a vertical direction within a stack are generally referred to as tiers.

A stowage plan is an allocation plan that allocates/assigns containers to be loaded at a port to positions on the vessel. For the purpose of the present description, the term position is intended to refer to a position on a vessel suitable for receiving a cargo item, such as a container. In general, a valid stowage plan should satisfy certain constraints including the packing rules of the vessel. Examples of such packing rules include physical constraints for the packing of containers, safety constraints, and support constraints, e.g. with respect to reefer containers which typically require a position with power supply.

It is generally desirable to provide a valid stowage plan that minimizes or at least reduces the time at berth and/or other contributions to a cost function. For example, this can be achieved by:
  Minimizing the makespan of the quay cranes by ensuring that each quay crane approximately has the same work load,
  Minimizing the total number of loads and unloads of containers. In particular this can be achieved by reducing the number of overstows. A container p overstows a container q in a stack if p is above q and q is destined to an earlier discharge port than p,
  Minimizing the total number of hatch-lifts and crane moves between bays.
  Minimize the number of times cranes must boom to pass the pilot house.

PRIOR ART

The generation of optimized stowage plans is a complex problem which previously has been performed manually by stowage coordinators. Recently, attempts have been made to provide automated methods for generating stowage plans.

It has been shown that minimizing overstows in general is NP-hard (see e.g. Avriel, Penn, & Shpirer, *Container Ship Stowage Problem: Complexity and Connection to the Coloring of Circle Graphs*, Discrete Applied Mathematics, 103, 271-279, 2000). Thus, the time required by known algorithms for solving the problem has been expected to grow exponentially or worse with the problem size. Moreover if we ignore that some stowage plans may be invalid, it is clear that the number of stowage plans is extremely large even for small vessels. For example, there are $70!>10^{100}$ different ways of stowing 70 containers into a vessel with 70 positions. Due to this, most researchers and practitioners believe that container vessel stowage planning is a very hard combinatorial problem and that the hardness of the problem grows fast with the size of the vessel.

Most prior art considers non-hierarchical methods. A non-hierarchical method uses a single fine-grained representation of the problem corresponding to its physical concrete representation. Early work based mainly on operation research techniques belong to this group (e.g. Botter & Brinita, *Stowage Container Planning: a Model for Getting an Optimal Solution*, Computer Application in the Automation of Shipyard Operation and Ship Design, VII-C, 217-229, 1992), but also recent approaches based on genetic algorithms (e.g., Dubrovsky, Levitin, & Penn, *A Genetic Algorithm with Compact Solution Encoding for the Container Ship Stowage Problem*, Journal of Heuristics, 8, 585-599, 2002 and International patent application WO 97/35266) and case-based reasoning (e.g., published German patent application DE102004031977A1) fall into this category. Non-hierarchical methods are only fast enough to be used in practice by coordinators for small feeder vessels of a few hundred TEU. The reason seems to be that it is difficult for them to handle essential high-level constraints such as makespan minimization because they only represent and manipulate a low-level representation of the problem.

The few hierarchical methods that exist (e.g. Wilson & Roach, *Principles of Combinatorial Optimization Applied to Container-Ship Stowage Planning*, Journal of Heuristics, 5, 403-418, 1999; Kang & Kim, *Stowage Planning in Maritime Container Transportation*, Journal of the Operation Research Society, 53, 415-426, 2002; and Ambrosino, Sciomachen, & Tanfani, *A Decomposition Heuristic for the Container Ship Stowage Problem*, Journal of Heuristics, 12, 211-233, 2006) use an abstraction where a high-level coarse-grained solver first assigns containers to storage areas on the vessel and a low-level fine-grained solver then independently for each storage area assign containers to concrete positions within the storage area. This abstraction; however, may be overly restrictive and result in suboptimal solutions.

In international patent application WO 97/35266 it was recognized that the objective function of the problem is highly non-linear. This follows from the discrete nature of the problem and the non-linear objectives such as overstowage and makespan minimization. Thus, it was previously believed that classical optimization models based on linear programming can not be used to construct stowage plans efficiently.

SUMMARY

Embodiments of the present invention are based on the realisation that container vessel stowage planning is indeed tractable by a computer-implemented method and—despite the beliefs expressed in the prior art—does not necessarily become harder with the vessel size. There are several reasons for this: Firstly, it is the density of constraints rather than the size of the combinatorial space that determines how hard a combinatorial problem is. Secondly, the NP-hardness result of Avrial et al. 2000 (ibid.) does not cover situations where there are as many stacks available as destination ports for stowing containers. Thus, the inventors believe the fact that the number of stacks in modern container vessels continue to grow may lower the computational complexity rather than increasing it. Finally, human coordinators are able to find stowage plans with reasonably high quality within a couple of hours. This defines a natural upper bound on the complexity of the problem.

Accordingly, embodiments of the present invention provide an efficient computer-implemented automated method for determining an allocation plan for a cargo stowage problem.

According to one aspect, a computer-implemented method is disclosed for determining an allocation plan for a cargo stowage problem of allocating a set of cargo items to a set of cargo item positions of a vessel, each cargo item position being suitable for receiving a cargo item. The method comprises:

providing/constructing an expression indicative of one or more constraints to be satisfied by said allocation plan, providing/constructing a cost function indicative of a cost of an updated allocation plan relative to a current allocation plan of said cargo stowage problem, iteratively updating a current allocation plan from an initial allocation plan to an updated allocation plan so as to decrease said cost function under said one or more constraints, wherein iteratively updating the current allocation plan includes iteratively updating the cost function.

The iterative update/refinement of the cost functions thus allows the use of standard optimization techniques to be applied to cargo stowage problems with complicated constraints, thereby providing an efficient method for generating an allocation plan which results in allocation plans of high quality even for large vessels, different types of containers, and a large number of constraints.

The expression and cost function may be represented by any suitable data structure. In some embodiments, an at least approximate optimization of a non-linear cost function is achieved by iterating over a linear cost function, e.g. a linear function including coefficients that depend on the current allocation plan and are re-calculated during each iteration. Hence, even very complex, non-linear contributions to the cost function can be treated with high accuracy and relatively few computational resources. In particular, in some embodiments, a linear cost function is constructed in each iteration such that the cost function defines the relative cost of changing a current assignment to a new one. The current assignment is updated with respect to this cost function and a new cost function relative to the new current assignment is computed. This is repeated until the quality of the current assignment is sufficiently high.

It is an advantage of the method described herein that it facilitates the solution of non-linear cost functions of stowage plans by means of fast classical optimization models based on linear programming. Hence, it can provide an assignment that minimizes the cost function fast, and it allows the use of known linear programming solvers, as well as techniques for model representation and optimization techniques for linear programming.

According to another aspect, a computer-implemented method is disclosed herein for determining an allocation plan for a cargo stowage problem of allocating a set of cargo items to a set of cargo item positions of a vessel, each cargo item position being suitable for receiving a cargo item. The method comprises:

determining/computing a preliminary distribution plan indicative of how many cargo items of each of a set of predetermined cargo classes are to be loaded to each of a set of storage areas of a vessel, each storage area including a set of cargo item positions;

providing said preliminary distribution plan as an input to a subsequent process for determining a refined allocation plan.

Hence, embodiments of the method described herein utilise a hierarchical decomposition of the allocation problem where containers or other cargo items are first distributed according to their respective cargo class to storage areas on the vessel in a coarse-grained phase. In a subsequent fine-grained phase, the cargo items are assigned to actual positions on the vessel.

In particular, embodiments of the method described herein avoid the over-constrained approach of distributing specific containers to storage areas. Instead, only the number of containers of each class of a set of container classes to be loaded in respective storage areas is determined in the first phase. In this way, the present invention merely deduces additional constraints to which storage areas containers can be assigned rather than assigning specific containers to each storage area. Hence, in embodiments of the method described herein, the subsequent assignment of specific containers to storage areas remains interrelated. In this way, low-level constraints considered in a subsequent phase are easier to solve due to the higher degrees of freedom at the subsequent phase. For example, it is possible in a subsequent phase to satisfy a low-level constraint like a reefer requirement or a stress limit by reassigning a container to another storage area.

Nevertheless, when the number of storage areas is smaller than the number of cargo item positions and/or the number of cargo classes is smaller than the number of cargo items, the computational complexity of the method is reduced.

The cargo classes may be determined based on one or more attributes associated with the cargo items, e.g. their physical dimensions, weight, etc, their type, supply requirements, and/or or the like. The storage areas typically include a plurality of positions. For example, each storage are may include one or more bays or one or more parts/sections of one or more bays of a vessel.

In some embodiments, the determination of the preliminary distribution plan is performed by solving an allocation problem using the technique of iteratively updating a cost function, e.g. a linear approximation of a non-linear cost function, as described herein. Hence, a current assignment of container classes to storage areas is iteratively improved.

In one embodiment, the method further comprises determining a refined allocation plan as an at least approximate solution of an allocation problem, said refined allocation plan being indicative of an allocation of individual cargo items to respective cargo item positions, said allocation problem including a first set of constraints, said first set of constraints including the preliminary distribution plan. Nevertheless, when during the coarse distribution stage only the number of cargo items of respective cargo classes are determined rather than assigning individual containers or sets of containers to storage areas, the storage areas are still interrelated during the generation of the refined allocation plan, because individual cargo items may still be allocated to one of a set of storage areas as long the constraints including the constraints on the distribution of numbers of cargo items of each class are fulfilled.

The refined allocation may be performed using a variety of methods. In some embodiments determining the refined allocation plan includes:

allocating respective subsets of cargo items to corresponding respective subsets of cargo item positions;

allocating respective cargo items of each subset of cargo items to respective cargo item positions of the corresponding subset of cargo item positions.

It will be appreciated that the above steps may be performed as separate stages, or interleaved with each other, e.g. by sequentially processing the respective subsets.

In some embodiments, the subsets of cargo items are sorted according to a predetermined priority assigned to each subset. Furthermore, heuristics for allocating said subsets can be efficiently implemented.

Alternatively, determining the refined allocation plan includes:

allocating respective cargo items to corresponding respective storage areas;

allocating each allocated cargo item to a cargo item position of said storage area.

Some embodiments of the method described herein include accurate and efficient models of constraints and objectives of the stowage planning problem. In particular, it has been realised that high-quality allocation plans may be achieved when the constraints and/or objectives include makespan minimization, constraints on containers that require certain supply connections, e.g. reefer constraints, and future port optimization:

Makespan minimization seeks to minimize the time at berth for the vessel to which all important costs such as crane utilization, total number of loads and unloads, average speed of vessel between ports etc. are tied.

Since reefer positions often are at the bottom of the stacks, they tend to be occupied by non-reefer containers. Reefer constraints seek to avoid occupation of reefer positions by non-reefer containers. Reefer containers, i.e. containers that provide a temperature-controlled (e.g. refrigerated) storage space, are an example of containers that require external connections when loaded on a vessel, e.g. electricity, fluids, such as gas, liquids, e.g. cooling fluids, and/or the like.

When expected loads at future ports on the string are taken into account, higher quality stowage plans are generated since it avoids the need to create space for problematic containers such as reefer containers or heavy containers at later ports. In some embodiments, cargo items scheduled to be loaded at future ports are considered at the initial coarse grain stage, while the subsequent generation of a refined allocation plan is limited to allocating cargo items to be loaded at a current port, thereby providing an efficient decomposition of the stowage problem.

According to yet another aspect, it is a problem of the above prior art methods that they only include methods for generating stowage plans from scratch.

According to this aspect, a computer-implemented method for generating a refined allocation plan from an input allocation plan for a vessel is disclosed. The method comprises:

providing/constructing a data structure for representing a current allocation plan, the current allocation plan being indicative of an allocation of a plurality of cargo items to respective cargo item positions of said vessel, and initializing the data structure to said input allocation plan;

computing a refined allocation plan by iteratively swapping the allocated positions of respective pairs of cargo items in said data structure to produce respective alternative allocation plans, and by selecting a refined allocation plan as one of the alternative allocation plans with a decreased value of a predetermined cost function relative to the current allocation plan.

Consequently, according to this aspect, embodiments of the method described herein provide an optimization of an existing stowage plan without breaking the constraints that the stowage plan satisfies. In embodiments of this method this is achieved by iteratively swapping the position of containers that are equivalent with respect to these constraints so as to improve a refined cost function and obtaining a refined allocation plan with a cost less or equal to the cost of the input allocation plan.

In some embodiments, computing a refined allocation plan includes computing respective refined sub-allocation plans by swapping cargo items within each corresponding sub-allocation plan, wherein each sub-allocation plan is indicative of the allocation of a corresponding sub-set of cargo items. In one embodiment, the input allocation plan is partitioned into sub-allocation plans such that two cargo items belonging to two distinct sub-plans violates the packing rules of said vessel if their positions are swapped, and each said sub-allocation plan is improved independently by swapping pairs of cargo items, thereby introducing a divide-and-conquer approach in order to reduce the computational complexity of the method.

It is noted that the features of the methods described above and in the following may be implemented in software and carried out in a data processing system or other processing means caused by the execution of computer-executable instructions. Alternatively, the described features may be implemented by hardwired circuitry instead of software or in combination with software. The term "processing means" comprises any suitable general- or special-purpose programmable microprocessor, Digital Signal Processor (DSP), Application Specific Integrated Circuit (ASIC), Programmable Logic Array (PLA), Field Programmable Gate Array (FPGA), special purpose electronic circuits, etc., or a combination thereof.

Embodiments of the present invention can be implemented in different ways, including the methods described above and in the following, a suitably configured data processing system, and further product means, each yielding one or more of the benefits and advantages described in connection with the first-mentioned methods, and each having one or more embodiments corresponding to the embodiments described in connection with the first-mentioned methods and/or disclosed in the dependent claims.

In particular, the invention further relates to a data processing system configured to perform the steps of one or more of the methods described above and in the following. The data processing system may comprise a suitably programmed computer, e.g. a personal computer. In some embodiments the data processing system may comprise a plurality of computers, e.g. one or more server computers and one or more client computers suitably connected via a computer network. In one embodiment, the data processing system comprises a central server system and a number of client systems. The client systems and the server system are configured to communicate with each other via a suitable communications link, e.g. a via a computer network, such as a local area network, a wide area network, an internet, or any other suitable communications network, or combination thereof.

BRIEF DESCRIPTION OF THE DRAWINGS

Embodiments will be described with reference to the drawing in which:

FIG. 2 schematically illustrates an example of a route of a cargo vessel.

FIG. 5 schematically illustrates an example of a matrix suitable for defining constraints of a stowage problem.

FIG. 9 schematically illustrates a data processing system for determining an allocation plan for a cargo stowage problem.

DETAILED DESCRIPTION

Figure 1:
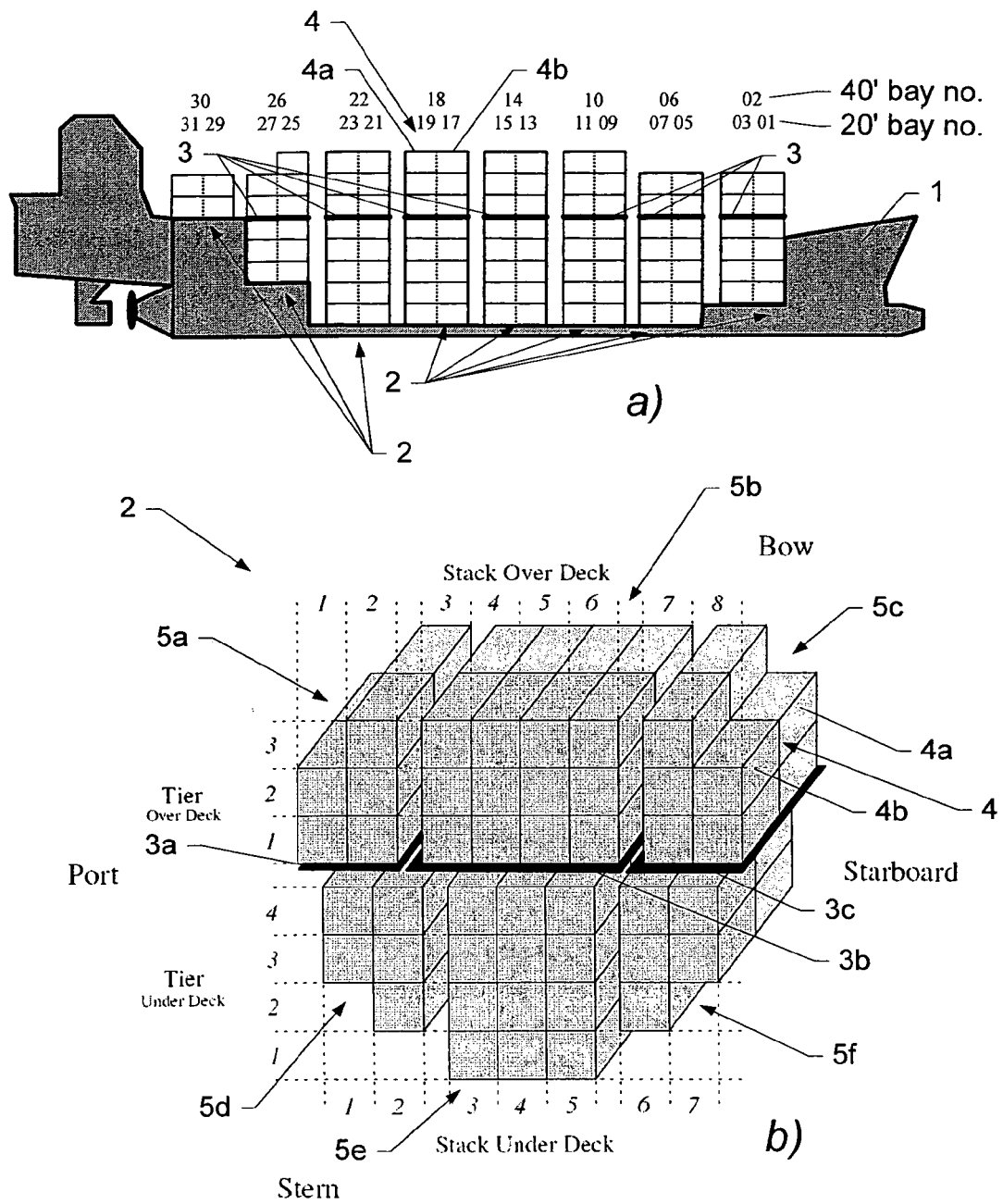
FIG. 1 schematically illustrates an example of storage areas and cargo item positions on a vessel.

FIG. 1 schematically illustrates an example of storage areas and cargo item positions on a vessel. A container vessel 1 typically includes of a number of bays 2 where single rows of 40' or 45' containers or double rows of 20' containers can be stacked (these may be referred to as 20' and 40' bays, respectively). For example, position 4 can hold a single 40' or 45' container or two 20' containers as illustrated by reference numerals 4a and 4b. FIG. 1a shows a typical numbering of the container stacks in the bays where even numbers are used for 40' bays while odd numbers are used for 20' bays. A number of hatch covers 3a-c divide the bays into under and over deck positions. FIG. 1b shows a schematic view of an example of the positions of a bay 2. This example assumes that there are three hatch covers 3a-c: one in the centre 3b and one in each side. It will be understood, however, that the number and arrangement of hatch covers may vary from vessel to vessel. Each level of containers is called a tier.

A possible way of representing the physical layout of the vessel is to use matrices. For example the bay positions shown in FIG. 1b can be arranged in a matrix B such that element $b_{ij}$ at row i and column j in B corresponds to the position at tier i and stack j. In this way, a matrix with Boolean values can be used to define whether a position exists in a bay or whether the position can hold containers of a particular type (e.g., reefer, 20', 40', or 45'). In a similar fashion, a matrix with integer values in the range {0, 1, 2} can denote the TEU capacities of the positions, e.g. as illustrated in FIG. 1c. If stacks under and over deck are misaligned with respect to each other, e.g. as illustrated in the example of FIG. 1b, it may be necessary to define separate matrices for positions under and over deck. As an example of a matrix representation, FIG. 1c shows a 4×7 matrix representing the TEU capacities of the positions under deck in FIG. 1b.

As mentioned above a valid stowage plan typically has to satisfy the packing rules of the vessel. The packing rules may include some or all of the following examples of constraints:

Physical constraints
    Containers must form physical stacks,
    OOG containers must be placed such that the extra cargo space is taken into account,
    Pallet-wide containers must be placed according to the requirements of their type,
    Open-top containers are placed on top of stacks under deck,
    20' containers can not be placed on top of 40' or 45' containers,
    Each stack must satisfy max height constraints,
    Each stack must satisfy max weight constraints,
    Quay cranes may need 40, 60, or 80 feet of separation in between cranes, Safety constraints
    In stacks over deck, a container on top of another container can at most be 5 tons heavier than the lower container,
    20' containers must be stowed such that twist locks are accessible,
    Wind stack forces on stacks over deck must be within limits,
    All IMO rules must be satisfied,
    Stability constraints must be met: metacentric height, trim, heeling, stress moments, and lashing forces must be within limits, Support constraints
    Reefer containers must be placed at positions with power supply,
    A container can only be placed at positions that allow its class.

However, it will be appreciated that alternative or additional constraints be formulated.

FIG. 2 schematically illustrates an example of a route of a cargo vessel. As mentioned above, the typical operation of a container vessel includes a voyage along a cyclic route connecting a sequence of ports also referred to as a string. FIG. 2 illustrates an example of a string 10 consisting of four ports A, B, C, and D. The vessel cyclicly serves these ports in the order A, B, C, D. From port D, the vessel sails to port A and proceeds with the next rotation. Thus, if the vessel is in port A, it will accept containers for port B, C, and D. Similarly, if the vessel is at port C, it will accept containers for port D, A, and B. In the above example, the vessel calls four ports. However, it will be appreciated that a container vessel may call any number of ports during one round-trip. In addition, it may call the same port several times on a rotation.

Figure 3:
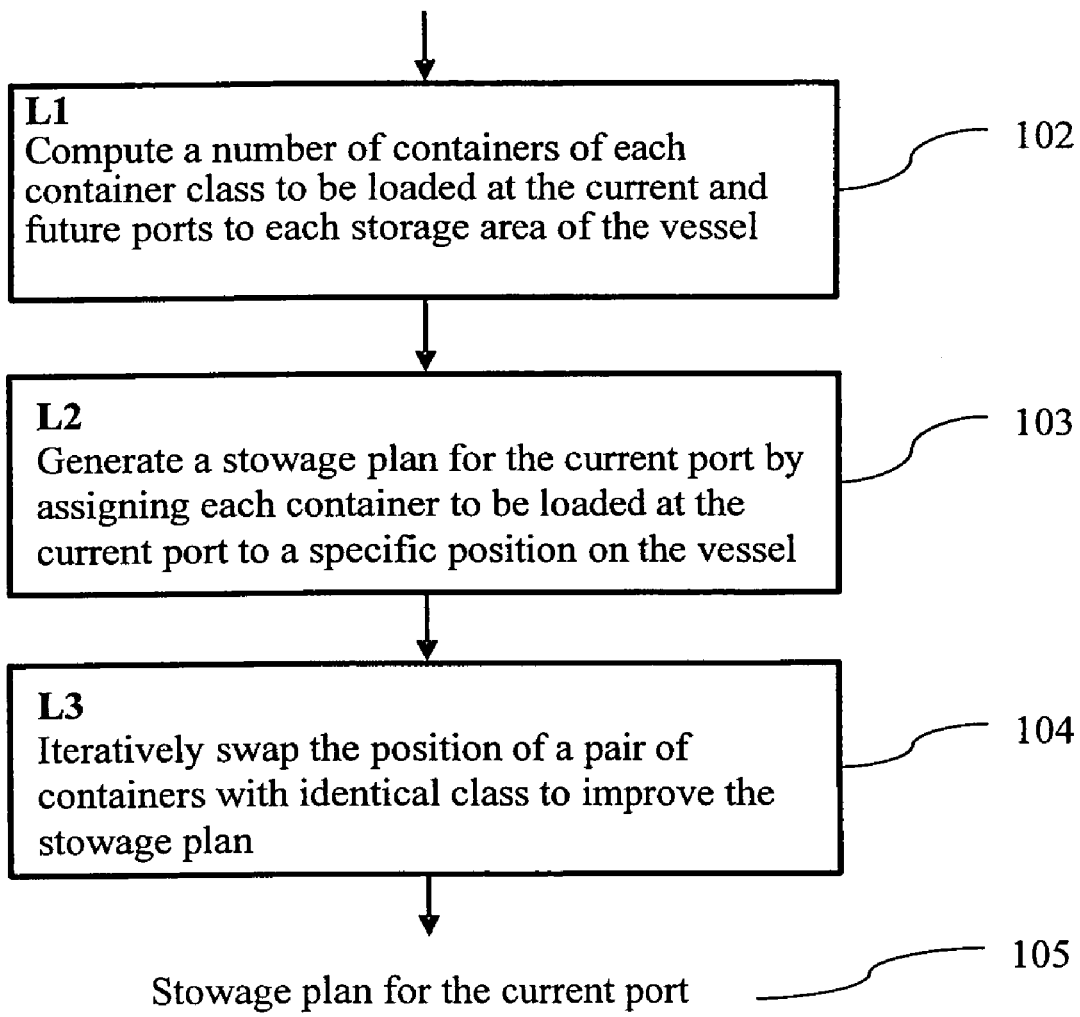
FIG. 3 shows an overall flow diagram of an example of a method of determining an allocation plan for a cargo stowage problem.

FIG. 3 shows an overall flow diagram of an example of a method of determining an allocation plan for a cargo stowage problem. The method comprises three linked optimizer stages L1, L2, and L3 that each solves the allocation problem at an increasingly finer level of granularity. The input to the method (101) is a) the physical layout of the vessel and the ports it calls on the rotation,
b) a list of containers on board the vessel at arrival of the current port,
c) a list of containers to be loaded at the current port, and
d) a list of containers expected to be loaded at the future ports on the rotation.

In the first step 102, L1 partitions the containers into a range of container classes and defines a set of main storage areas of the vessel. L1 then determines the number of containers of each container class to load in each storage area. To foresee future needs, the allocation is done not only for the current port but also for the future ports on the rotation.

In the second step 103, L2 uses the number of containers of each class to store in each storage area in the current port computed by L1 to assign containers to be loaded in the current port to specific positions on the vessel. The result is a stowage plan for the current port.

In the third step 104, L3 performs a post-optimization of the stowage plan generated by L2. L3 improves the stowage plan by iteratively swapping the position of a pair of containers belonging to the same container class. The output from the method 105 is a stowage plan for the current port assigning the containers to be loaded at the current port to specific positions on the vessel. It will be appreciated that, in some embodiments, the allocation process may include the L1 stage alone, or the L1 stage combined with the L2 stage, or the L1 stage followed by the L2 stage and a different form of post-processing, or a different combination of the stages described herein, optionally with one or more pre- and/or post-processing stages.

Figure 4:
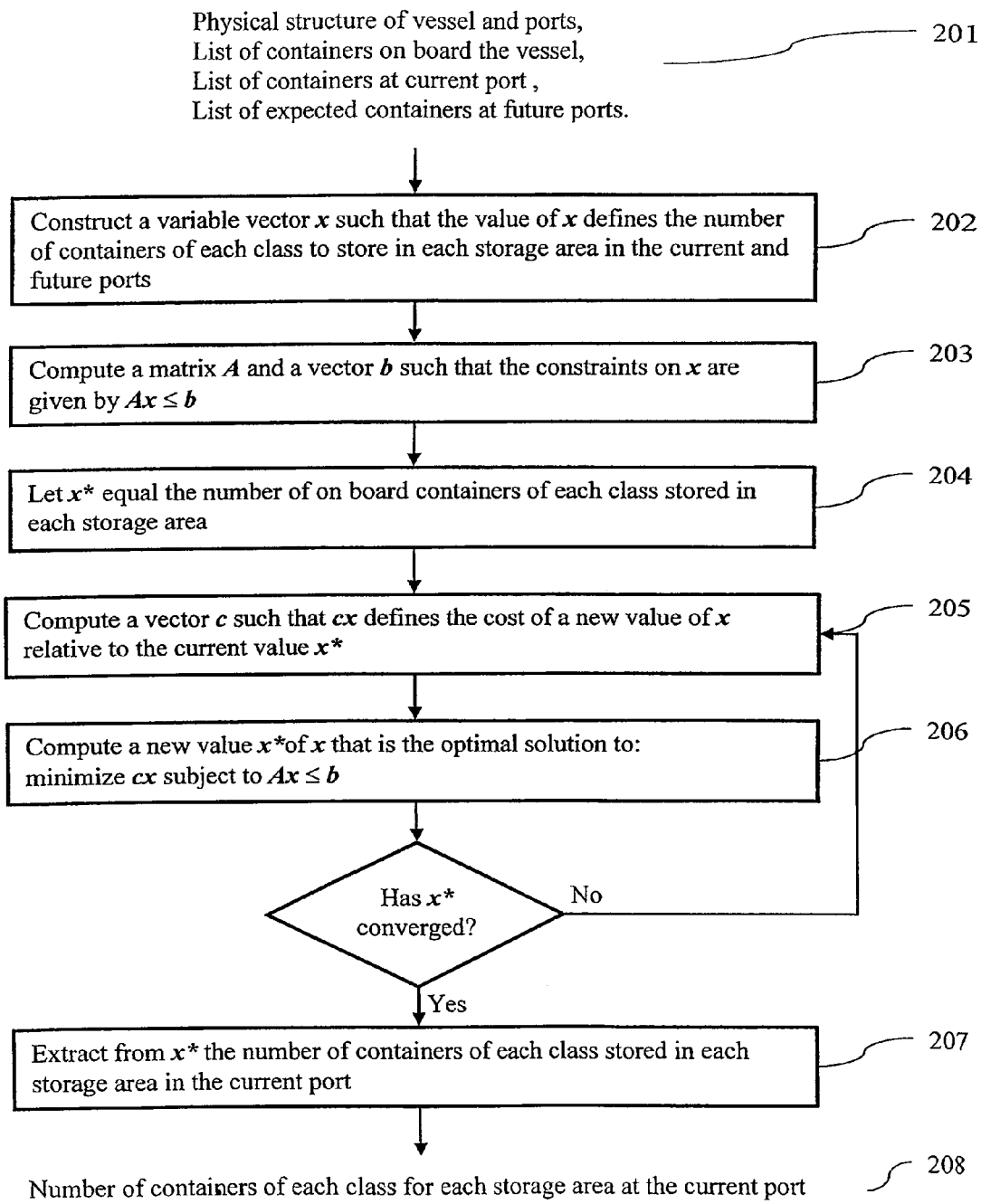
FIG. 4 shows a flow diagram of an example of the L1 stage of a method of determining an allocation plan for a cargo stowage problem.

FIG. 4 shows a flow diagram of an example of the L1 stage of a method of determining an allocation plan for a cargo stowage problem. The input to L1, 201 is the same as the input to the overall process shown in FIG. 3:

a) The physical layout of the vessel and the ports it calls on the rotation. The vessel layout includes the arrangement of bays and the container positions of each bay under and over deck. It moreover defines the attributes of each position (e.g., what lengths of containers the position can hold and whether it can hold reefer containers). An example of a representation of the vessel layout has been described with reference to FIG. 1 above. The physical layout of ports includes the number of quay cranes available in each port, b) A list of containers on board the vessel at arrival of the current port. The list contains the position of each container and their attributes including their load port, discharge port, length, height, weight, width, and whether the container is a reefer, c) A list of containers to be loaded at the current port, d) A list of containers expected to be loaded at the future ports on the rotation.

The lists in c) and d) may include the discharge port, length, height, and width of each container, and whether it is a reefer. L1 solves a generalised version of the allocation problem. L1 both generalises the set of containers to load on the vessel and the set of positions that containers are assigned to.

A number of container classes are defined. Each container class represents containers that have at least one attribute out of a predetermined set of attributes in common. Examples of such attributes include length attributes (e.g., 20', 40', and 45') and a reefer attribute. It will be appreciated that additional or alternative attributes may be used to define further container classes, for instance height attributes (e.g., high-cube), weight attributes (e.g., heavy and light), pallet-wide attributes (e.g., PW-class-x), out-of-gauge attribute (e.g., top-OOG, side-OOG, and front-OOG), and IMO attributes (e.g., IMO-class-x).

The set of positions of bays over and under deck are partitioned into a number of storage areas. An example of storage areas of a single bay is shown in FIG. 1*b*. In particular, FIG. 1*b* shows the positions of each container stack of a bay. Notice that each position either can hold a long 40' or 45' container or two 20' containers. The stacks form six storage areas 5*a-f*, three over deck and three under deck, designated 5*a-c* and 5*d-f*, respectively. The three pairs of storage areas (designated 5*a,d*; 5*b,e*; 5*c,f*, respectively) over and under deck are separated by respective hatch covers; 3*a-c*.

It will be appreciated that other divisions of positions into storage areas are possible. For example, some of the above storage areas may be merged. For instance, to avoid loading more containers in the port or starboard side of the ship, the two pairs of wing storage areas 5*a,d* and 5*c,f*, respectively over and under deck may be merged resulting in a total of four instead of six storage areas of the bay. However, other merging strategies may be used, e.g. for large vessels.

L1 determines how many containers of each class that each storage area holds. To foresee space needs in future ports, L1 not only computes this allocation for the containers to load in the current port (given by input c), but also for the expected containers to load in future ports (given by input d). Any concrete stowage plan must satisfy the constraints generated by L1 about how many containers to allocate of each class in each storage area. So long as these rules are satisfied, however, a specific container can be placed in any desired storage area. In this way, L1 generates a flexible generalised solution that can accommodate a wide range of concrete solutions.

In the first step 202, L1 defines a variable vector x to represent the solution space. For each storage area s and each container class c there is a variable in x for each possible load port i and discharge port j such that the value $x_{csij}$ of the variable defines how many containers of class c are loaded to the storage area s in port i and unloaded from s in port j. In order to use linear programming solvers to solve the optimization problem, x is a real valued vector even though only integer solutions are valid.

In the second step 203, L1 computes a matrix A and a vector b such that the constraints of the optimization problem are given by the set of linear inequalities $Ax \leq b$. The inequalities include the following constraints a) $x \geq 0$ for all $x \in x$, b) All containers at the current and future ports are loaded on the ship, c) All containers discharged at the current and future ports are unloaded from the ship, d) The 20'/40'/45' and reefer capacity limits for each storage area are satisfied, e) The total capacity limits for each storage area are satisfied, f) The number of reefer containers loaded in each storage area is not larger than the total number of containers loaded in the storage area. The purpose of this constraint is to relate the variables in x of the reefer and length classes to each other.

Further constraints generally known in the container shipping industry or described in the literature (e.g., [Botter & Brinita, Stowage *Container Planning: a Model for Getting an Optimal Solution*, Computer Application in the Automation of Shipyard Operation and Ship Design, VII-C, 217-229, 1992], [Wilson & Roach, *Principles of Combinatorial Optimization Applied to Container-Ship Stowage Planning*, Journal of Heuristics, 5, 403-418, 1999], [Kang & Kim, *Stowage Planning in Maritime Container Transportation*, Journal of the Operation Research Society, 53, 415-426, 2002], and [Ambrosino, Sciomachen, & Tanfani, *A Decomposition Heuristic for the Container Ship Stowage Problem*, Journal of Heuristics, 12, 211-233, 2006]) can be added (e.g., to take into account IMO, line-of-sight or user defined rules, weight and volume limits of storage areas, or restrictions on high-cube, out-of-gauge, or pallet-wide containers). These constraints can be translated into inequalities using modelling techniques similar to the ones described below.

The constraints listed above are translated into linear inequalities using standard mathematical programming modelling techniques (an introduction to these techniques is given in [Williams, *Model Building in Mathematical Programming*, 4$^{th}$, edit., Wiley, 2005]). As an example, assume that we have four container classes C={20, 40, 45, R} defined by the length attributes 20', 40', and 45' and a reefer attribute (R). Notice that the classes of the three length attributes $C_{len}$={20, 40, 45} form a partitioning of the containers. Thus, the union of the containers in these classes is equal to the total set of containers. Assume that $x_{csij}$ is the number of containers of class c∈C to load in port i and discharge in port j for storage area s. Since containers are hardly loaded and discharged in the same port, we can assume that $x_{csij}$=0 for i=j.

Consider a vessel on the string A, B, C, D as shown in FIG. 2. For the purpose of this example, we will assume that the ports are numbered lexicographically such that port A is the first port, port B is the second port etc. The $x_{csij}$ variables of a particular container class c and storage area s can be regarded as forming a load-discharge matrix $X_{cs}$, where row i and column j contains variable $x_{csij}$. Thus, the value of variable (i,j) in $X_{cs}$ is equal to the number of containers of class c loaded in port i and discharged in port j for storage area s. We can use this matrix to define patterns of variables that have meaningful sums and are useful for defining linear inequalities of the constraints. For instance, the sum of the row and column variables of a port p defines how many containers to load and discharge at the port, respectively. Another example is the onboard ($O_p$) pattern for port p. The sum of the variables in $O_p$ is the number of onboard containers when the vessel departures from port p. A pattern can be defined by a characteristic matrix E where an element $e_{ij}$ equals 1 if and only if the variable index pair (i,j) belongs to the pattern. FIG. 5 shows an example of the characteristic matrix of the onboard pattern for port B (i.e., $O_2$). Notice that containers loaded in port i and discharged in port j<i roll over to the next rotation. Thus, the single "1" (designated by reference numeral 8) in row 4 of column 3 of $O_2$ refers to containers loaded in the previous rotation.

Assume
S is the set of storage areas of the vessel,
P is the set of ports on the rotation string,
$lo_{cp}$ is the number of containers of class c to load in port p,
$di_{cp}$ is the set of containers of class c to discharge in port p,
$max_{cs}$ is the maximum number of containers of class c to store in storage area s,
$cap_s$ is the total capacity of storage area s in TEU.

We may use the constants and patterns defined above to formally define linear expressions of the constraints as a) $x_{csij} \geq 0$ for $c \in C$, $s \in S$, $i \in P$, and $j \in P$, b) $\sum_{s \in S} \sum_{i \in P} x_{cspi} = lo_{cp}$ for $c \in C$ and $p \in P$, c) $\sum_{s \in S} \sum_{i \in P} x_{csip} = di_{cp}$ for $c \in C$ and $p \in P$, d) $\sum_{ij \in O_p} x_{csij} \leq max_{cs}$ for $c \in C$, $s \in S$ and $p \in P$, e) $\sum_{ij \in O_p} x_{20sij} + 2x_{40sij} + 2x_{45sij} \leq cap_s$ for $s \in S$ and $p \in P$, f) $\sum_{ij \in O_p} x_{Rsij} \leq \sum_{ij \in O_p} \sum_{c \in C_{len}} x_{csij}$ for $s \in S$ and $p \in P$.

The linear expressions above can be transformed to linear inequalities on the form Ax≦b using standard techniques from mathematical programming.

In the third step 204, L1 computes an initial current value x* of x based on the containers on board the vessel at arrival at the current port (given by input b).

In the fourth step 205, L1 computes a linear cost function on x. The cost function is given by a vector c such that the cost of a solution is given by the scalar product cx. The cost function depends on the current value of x. Let c(x*) denote the vector function that defines c for the current value x* of x. The product c(x*)x then defines a linear cost function on x relative to x*. The cost function is an approximation to the real cost of changing x*. The real cost function is non-continuous due to discrete cost elements (e.g., overstows and crane-sets) and therefore nonlinear. The cost function is defined by a weighted sum of the following cost elements a) Costs of crane moves of containers, b) Costs for having adjacent bays with significantly more moves than the average number of moves per bay. This cost element tries to ensure that even crane splits can be made such that the makespan of cranes is close to minimal, c) Costs for introducing crane-sets. A crane-set occurs when a crane is moved to a bay. Thus a crane-set is introduced when loads or unloads are assigned to an otherwise inactive bay in a port, d) Costs for introducing intra storage area overstows. Intra storage area overstows happens when containers with discharge ports between the load and discharge ports of existing containers are placed in a storage area.

Further costs or modifications of the defined costs generally known in the container shipping industry or described in the literature can be added (e.g., to include costs for not using reefer or 45' positions in a storage area, introducing hatch-lifts, introducing overstows between storage areas above each other or between new containers to load in the ports and containers already onboard the vessel in port 1, introducing crane booming, not having the same discharge port of a stack above and under deck, introducing Suez fees, or causing extra ballast water to be used). Many of these costs may be approximated in a linear form using modelling techniques similar to the ones described below.

As for constraints, the translation of the cost elements above to linear costs on x can be based on classical mathematical programming techniques. In particular, bullet b) describes a cost for breaking a constraint. Such a soft constraint can be modelled by adding an auxiliary variable to x. Consider a linear constraint ax≦b. To add a cost u for each unit this constraint is broken, we extend x with an auxiliary variable x'

$$ax - x' \leq b$$

and set the cost element for x' in c equal to u.

In order to define the linear cost function formally, we first define a set of auxiliary variables $x_{qp}$ of x associated with the soft constraint described under bullet b). Assume $Q \subseteq 2^S$ is the set of storage areas in any two adjacent bays, $cr_p$ is the number of cranes in port p, $u_p$ is the average number of moves per crane in port p.

A linear expression of the soft constraint can then be formally defined as $$\sum_{c \in C_{len}} \sum_{s \in q} \sum_{i \in P} (x_{cspi} + x_{csip}) - x_{qp} \leq \mu_p \text{ for } q \in Q \text{ and } p \in P,$$

where $$u_p = \frac{\sum_{c \in C_{len}} \sum_{s \in S} \sum_{i \in P} (x_{cspi} + x_{csip})}{cr_p}.$$

The linear expressions of the soft constraint can be transformed to linear inequalities using standard techniques from mathematical programming such that both soft and hard constraints can be expressed in the form $Ax \leq b$.

The cost function is a linear expression on x that depends on the current value x* of x. It is a weighted sum of each of the cost elements described under bullet a) to d) above $$w_a c_a(x) + w_b c_b(x) + w_c c_c(x^*)(x) + w_d c_d(x^*)(x).$$

Notice that only cost element c and d depend on x*.

The linear expression of cost element a and b can formally be defined by $$c_a(x) = \sum_{c \in C_{len}} \sum_{s \in S} \sum_{i \in P} \sum_{j \in P} x_{csij},$$

$$c_b(x) = \sum_{q \in Q} \sum_{p \in P} x_{qp}.$$

The linear expression of costs element c can be defined by distributing the cost of moving a quay crane to a bay on the containers moved to and from the bay. Thus, the crane-set cost for a container loaded to a bay in port i and discharged in port j in a new solution is the inverse of the number of moves for the bay in the load port plus the inverse of the number of moves for the bay in the discharge port of the current solution x*. This is a fairly accurate approximation to the true crane-set cost so long as the new value of x is close to x*. Assume that B denotes the set of bays of the vessel and that $S_b$ is the set of storage areas of bay b. The linear expression of cost element c can then formally be defined by $$c_c(x^*)(x) = \sum_{c \in C_{len}} \sum_{b \in B} \sum_{s \in S_b} \sum_{i,j \in P} \left( \frac{1}{m_{bi}} + \frac{1}{m_{bj}} \right) x_{csij},$$

where $$m_{bp} = \max\left\{1, \sum_{c \in C_{len}} \sum_{s \in S_b} \sum_{i \in P} x^*_{cspi} + x^*_{csip} \right\}.$$

Notice that $m_{bp}$ is forced to be larger or equal to 1 to ensure that the inverse is defined.

The linear expression of cost element d can be defined by introducing a cost for any containers assigned to a storage area that may overstow containers stored in the storage area by x*. Let H(I,d) denote the characteristic matrix of the pattern of variables that potentially overstow containers loaded in port I and discharged in port d. We have $h(I,d)_{i,j}=1$ if and only if, i is a port after I but before d, and j is a port after d. Further, let $Z_s$ denote the index set of active load and discharge ports in x* for storage area s $$Z_s = \left\{ (i,j) \, \middle| \, \sum_{c \in C_{len}} (x^*)_{csij} > 0 \right\}.$$

We can then define the pattern of variables with potential overstow in storage area s with respect to containers stored in s by x* as $$H_s = \bigvee_{ij \in Z_s} H(i,j).$$

The linear expression of cost element d can then formally be defined by $$c_d(x^*)(x) = \sum_{c \in C_{len}} \sum_{s \in S} \sum_{ij \in H_s} x_{csij}.$$

As for the linear expressions of hard and soft constraints, standard mathematical programming techniques can be used to translate the cost function to the form c(x*)x. The weights $w_a$, $w_b$, $w_c$, and $w_d$ depend on the actual costs of the problem.

It is an interesting property of L1 that an optimal solution to the approximated cost function can be computed fast using an off-the-shelf linear programming solver (LP-solver) like COIN or CPLEX.

In the fifth step 206, L1 computes a new value of x* that is the optimal solutions to the problem: minimize c(x*)x subject to $Ax \leq b$. The problem is solved using an LP-solver.

The fourth and fifth step of L1 is repeated until x* does not change or until a bound on the number of iterations is reached.

Since containers are indivisible, x can only take integer values. This is ignored in the above formulation to avoid transforming the LP problem to an Integer Programming problem (IP). The computational complexity of an IP problem is often much higher than its corresponding LP problem. It is well-known from mathematical programming, however, that when x denotes large integer quantities, the optimal solution of the IP problem is often close to the optimal solution to the corresponding LP problem rounded off to integer values. Since x in our case denote fairly large integer values, we achieve good integer solutions by rounding off the optimal but possibly fractional x* returned by the LP-solver.

In the sixth step 207, L1 extracts and returns the part of x* that involves the current port. Information about the distribution of containers in future ports is not passed to L2 and L3, 207. These optimization modules generate and refine the stowage plan for the current port.

As mentioned above, L2 generates a complete stowage plan for the current port that respects the distribution of container classes on storage areas as computed by L1. In the following, two embodiments of the L2 stage will be described with reference to FIGS. 6 and 7 that can be used to solve this sub-optimization problem. The first embodiment will be referred to L2A. L2A is a hybrid optimization method combining a concrete heuristic and a linear assignment problem for placing containers to be loaded at the current port to specific positions on the vessel. It places groups of containers on the vessel such that the number of containers of each class assigned to each storage area respects the limits computed by L1. The second embodiment will be referred to L2B. L2B is an optimization method combining two assignment problems. The first assigns containers to storage areas such that the number of containers of each class respects the limits computed by L1. The second is used to allocate containers assigned to each storage area to specific positions within the storage area. It will be appreciated that other optimization methods may be used at the L2 stage. In some embodiments, the results of the L1 stage may even be forwarded directly to a human stowage coordinator who then performs the subsequent stowage planning manually or, in a semi-automated fashion.

Figure 6:
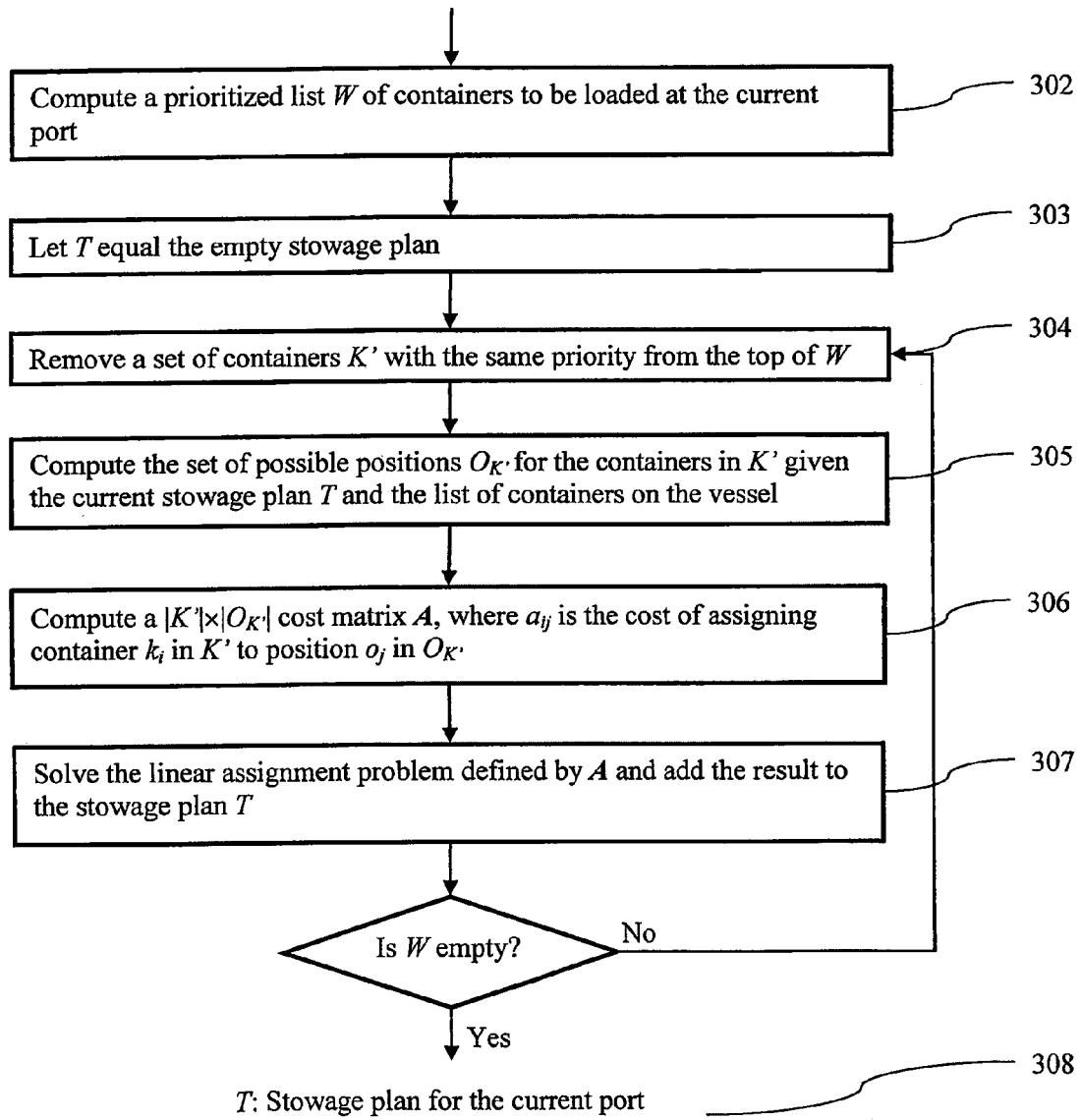
FIG. 6 shows a flow diagram of an example of the L2 stage of a method of determining an allocation plan for a cargo stowage problem.

FIG. 6 shows a flow diagram of an example of the L2 stage of a method of determining an allocation plan for a cargo stowage problem. For the purpose of the present description this embodiment will be referred to as L2A. The input to L2A, 301, is the same as for L1 except that L2A does not consider containers expected to be loaded in future ports. Instead L2A takes as input the number of containers of each class for each storage area at the current port generated by L1, i.e. $x_{csij}$ for a given i.

In the first step, 302, L2A generates a prioritized list W of the containers to be loaded in the current port. The priority of a container increases linearly with the distance the container is shipped. Since containers are filled bottom-up in the vessel (due to the objective function), this ordering ensures that no loaded containers overstow each other. Containers to the same discharge port are sub-prioritized according to how hard they are to place in the vessel. This prioritization defines a placement heuristic. Since L2A does not reassign positions, the ordering ensures that hard containers have more freedom in how they can be placed than easy containers.

For example this sub-prioritization can reflect that a) reefer containers are placed before non-reefers since there are a restricted number of reefer positions, b) heavy containers are place before light containers since they affect the stability and stress factors more and use a higher proportion of the weight capacity of stacks and bays, and c) 20' containers are place before 40' and 45' containers to avoid illegal placements of 20' containers on top of 40' or 45' containers.

In the second step, 303, L2A defines an initially empty stowage plan T for the current port. The stowage plan is completed during the iterations of the main loop of L2A.

In the third step, 304, L2A enters the main loop and removes a chunk K' of containers from the top of W with the same priority. Thus, the containers in K' are shipped to the same discharge port and have the same reefer and length attributes.

In the fourth step, 305, L2A generates a set of possible positions $O_{K'}$ on the vessel for the containers in K'. $O_{K'}$ may span several storage areas but must respect the number of containers of each class assigned to storage areas by L1. Moreover, $O_{K'}$ can not contain any occupied positions in the current stowage plan T.

In the fifth step, 306, L2A computes a $|K'| \times |O_{K'}|$ cost matrix $A=[a_{ij}]$, where $a_{ij}$ is the cost of assigning container $k_i$ in K' to position $O_j$ in $O_{K'}$. The cost function is a weighted sum of the following objectives
  a) Maximize the match between the attributes of the container and the position. Thus, place reefer containers at reefer positions, 45' containers at positions that accommodate long containers etc.,
  b) Place heavy containers at the bottom of stacks,
  c) Fill each stack from bottom to top.

Further costs or modifications of the defined costs generally known in the container shipping industry or described in the literature can be added (e.g., to avoid height and weight limits of stacks to be broken, to consider further stress and stability objectives, and to place out-of-gauge, open-top, IMO, and other special containers at desirable positions). Many of these costs may be modelled using techniques similar to the ones described below.

As for L1, standard mathematical programming techniques can be used to translate the objectives into the cost matrix A. We have $$A = w_a A_a + w_b A_b + w_c A_c,$$

where $w_a$, $w_b$, and $w_c$ are weights that reflect the importance of each cost element. These weights may be calibrated experimentally or estimated from real costs associated with the objectives.

Assume
  $attr(k_i)$ is the set of attributes of container $k_i$ (e.g., $attr(k_i) \subset \{20, 40, 45, R\}$),
  $\overline{attr(o_j)}$ is the set of attributes that can be accommodated by position $o_j$ (e.g., $attr(o_j) \subset \{20, 40, 45, R\}$),
  $weight(k_i)$ is weight of container $k_i$,
  $level(o_j)$ is the level of $o_j$ measured from the bottom of the stack $o_j$ belongs to (e.g., $level \in \{0, 1, 2, \ldots\}$).

The cost elements of A can then formally be defined as $A_a=[aa_{ij}]$, $A_b=[ab_{ij}]$, $A_c=[ac_{ij}]$, where $$aa_{ij} = 4 - |attr(k_i) \cap attr(o_j)|,$$

$$ab_{ij} = weight(k_i) * level(o_j),$$

$$ac_{ij} = level(o_j).$$

In the sixth step, 307, L2A solves the linear assignment problem defined by A. The assignments are further constrained such that the number of containers assigned to each storage area does not exceed the maximum number of containers to the discharge port computed by L1. Off-the-shelf solvers like COIN and CPLEX are sufficiently strong to get low computation times in practice.

The assignment of positions to the containers in K' is added to the stowage plan T. If W contains no further containers, L2A returns the completed stowage plan T for the current port, 308. Otherwise, L2A loops back to the third step, 304, and removes the next chunk of containers from W.

Figure 7:
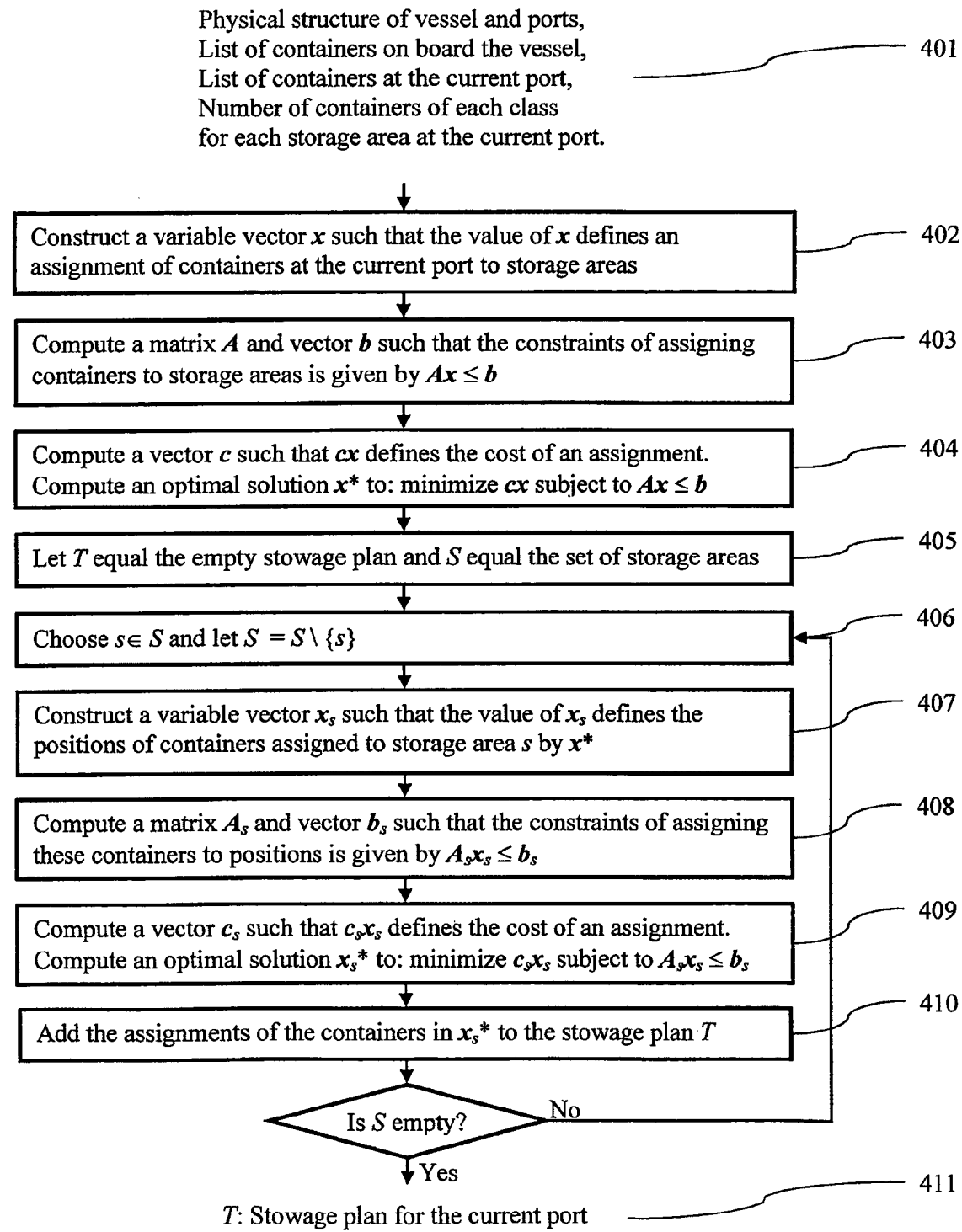
FIG. 7 shows a flow diagram of an example of the L2 stage of a method of determining an allocation plan for a cargo stowage problem.

FIG. 7 shows a flow diagram of an example of the L2 stage of a method of determining an allocation plan for a cargo stowage problem. For the purpose of the present description this embodiment will be referred to as L2B. The input to L2B, 401, is the same as for L2A.

Let K and S denote the set of containers to load in the current port and the set of storage areas of the vessel, respectively. In the first step, 402, L2B defines a variable vector x to represent assignments of containers to storage areas. For each container k in K and each storage area s in S there is a variable in $x_{ks}$ in x. The value of $x_{ks}$ is between 0 and 1. It is 1 if container k is assigned to storage area s.

In the second step 403, L2B computes a $|N| \times |S|$ matrix A and vector b such that the constraints of the assignment problem are given by the set of linear inequalities $Ax \leq b$. The inequalities include the following constraints
  a) $0 \leq x \leq 1$ for all $x \in x$,
  b) A container can at most be assigned to one storage area.
The constraint described under bullet a) is already on linear form. The constraint described under bullet b) can be expressed in linear form by $$\sum_{s \in S} x_{ks} = 1 \text{ for } k \in K.$$

Standard techniques from mathematical programming can be used to transform these linear expressions into the format $Ax \leq b$.

In the third step 404, L2B computes a linear cost function on x. The cost function is given by a vector c such that the cost of assignments is given by cx. The cost function includes the following objectives that are weighted according to their importance a) Load all containers,
b) For each storage area, load the number of containers for each discharge port as computed by L1,
c) For each storage area, load the number of containers of each container class as computed by L1,
d) Do not place more high-cube containers in storage areas under deck than the unused space of the storage area allows.

Further objectives or modifications of the defined objectives generally known in the container shipping industry or described in the literature can be added (e.g., to optimize the weight distribution of containers under and over deck, to respect weight limits of storage areas, and to avoid allocating containers to storage areas unused by L1). Many of these costs may be modelled using techniques similar to the ones described below.

Each of the objectives can be represented by soft constraints. Recall from L1 that a hard constraint $ax \leq b$ can be translated to a soft constraint by adding an auxiliary variable x' to x associated with a cost per unit in c for breaking the constraint and changing the constraint to $ax - x' \leq b$. This technique can be used to formulate the objectives described under bullet a) to c). In order to achieve integer values of the decision variables for high-cube containers in x, however, it may be an advantage to translate the objective described under bullet d) to the format $ax - Mx' \leq b$, where M is a constant such that $M > ax$ for any value of x (big-M format). In this way, a one-time cost for breaking the constraint can be modelled if x' is integer.

Assume $L_{ps}$ is the number of containers with discharge port p assigned to storage area s by L1, $L_{cs}$ is the number of containers of class c assigned to storage area s by L, $H_s$ is the maximum number of high-cube containers that can be stored in storage area s, $S_U \subseteq S$ is the subset of storage areas under deck, $K_p \subseteq K$ is the subset of containers with discharge port p, $K_c \subseteq K$ is the subset of containers of class c, $K_H \subseteq K$ is the subset of containers that are high-cube.

We can then define linear expressions of the cost elements as follows a) $\sum_{k \in K} \sum_{s \in S} x_{ks} + xa \geq |K|$, b) $\sum_{k \in K_p} x_{ks} - xb_{ps} \leq L_{ps}$ for $p \in P$ and $s \in S$, c) $\sum_{k \in K_c} x_{ks} - xc_{cs} \leq L_{cs}$ for $c \in C$ and $s \in S$, d) $\sum_{k \in K_H} x_{ks} - 1000 xd_s \leq H_s$ for $s \in S_U$.

As for L1, standard mathematical programming techniques can be used to formulate the linear inequalities $Ax \leq b$ of the linear expressions of the soft constraints above. In this equation, the variable vector x has been extended with the auxiliary variables xa, $xb_{ps}$, $xc_{cs}$, and $xd_s$. The cost vector c has all zero elements except for the auxiliary variables for which the associated cost elements ca, $cb_{ps}$, $cc_{cs}$, $cd_s$ are equal to the weights of the objectives $w_a$, $w_b$, $w_c$, and $w_d$. Thus, $ca = w_a$, $cb_{ps} = w_b$ for $p \in P$ and $s \in S$, $cc_{cs} = w_c$ for $c \in C$ and $s \in S$, $cd_s = w_d$ for $s \in S_U$.

The weights can be calibrated experimentally or estimated from real costs of breaking the soft constraints.

In the second part of the third step, L2B computes an optimal solution x* to the linear optimization problem: minimize cx subject to $Ax \leq b$. This problem can be solved efficiently using of-the-shelf LP/IP solvers such as COIN and CPLEX. Some values of decision variables in x* may not be integral. In practice, however, good integral solutions can be found by rounding off x*.

In the fourth step 405, L2B enters its iterative phase where the containers assigned to each storage area are given specific positions in the storage area. L2B initializes this phase by instantiating the stowage plan T to empty and setting the set S of storage areas to process to equal the total set of storage areas on the vessel.

In the fifth step 405, L2B removes a storage area s from S.

In the sixth to eighth step (407, 408, and 409), L2B formulates and solves the assignment problem minimize $c_s x_s$ subject to $A_s x_s \leq b_s$ for storage area s. The optimal solution $x_s^*$ to the optimization problem can be computed using an of-the-shelf LP/IP solver such as COIN or CPLEX. Again, it may be necessary to round off $x_s^*$ to get integral values.

Let K and O denote the containers assigned to s by x* and the positions in storage area s, respectively. For each container k in K and each position o in O, the value of the decision variable $x_{ko}$ of $x_s$ is 1 if container k is assigned to position o. The parameters $c_s$, $A_s$, and $b_s$ define the constraints and objectives of the problem. They are constructed in the same way as the corresponding parameters in the first assignment problem solved by L2B. The $A_s$ and $b_s$ parameters include the following hard constraints a) $0 \leq x \leq 1$ for all $x \in x_s$,
b) A container can at most be assigned to a single position,
c) Assign all containers,
d) Do not assign more containers to a position than it can hold,
e) Only assign containers to positions that can fit its class.

Further hard constraints or modifications of the defined hard constraints generally known in the container shipping industry or described in the literature can be added (e.g., to obey stack weight and height limits, and to respect IMO rules and placement rules for other special containers such as out-of-gauge and open-top containers). Many of these costs may be modelled using techniques similar to the ones described below.

The constraint described under bullet a) is already on linear form and the description of step 404 above includes examples of how to make linear expressions of the constraints described under bullet b) and c). For the constraints described under bullet d) and e) assume $vol_k$ is the size of container k measured in TEU, $cap_o$ is the TEU capacity of position o, $K_c \subseteq K$ is the subset of containers belonging to class c, $O_{\neg c} \subseteq O$ is the subset of positions that do not support containers of class c.

Linear expressions of the constraints can then be formalized as d) $\sum_{k \in K} vol_k x_{ko} \leq cap_o$ for $o \in O$, e) $\sum_{o \in O_{\neg c}} x_{ko} = 0$ for $c \in C$ and $k \in K_c$.

Again, standard mathematical programming techniques can be used to translate these linear expressions into the form $A_s x_s \leq b_s$.

The cost function $c_s$ includes the following weighted objectives
 a) Load stacks bottom to top,
 b) Load heavy containers at the bottom of stacks,
 c) Load containers to latest discharge port at bottom of stacks
 d) Avoid overstowing a previously loaded container in a stack,
 e) Avoid loading more high-cube containers in a stack under deck than the unused space of the stack allows.

Further objectives or modifications of the defined objectives generally known in the container shipping industry or described in the literature can be added (e.g., to load bays from center and out to achieve better balance, to load every second bay port side first to achieve better balance, to avoid 40' and 45' in same stack over deck, to avoid 20' and 40/45' in same stack over deck to minimize the risk of placing 20' containers above 40/45' containers, to minimize IMO rule conflicts, and to satisfy placement constraints of special containers such as open-top and out-of-gauge containers). Many of these objectives may be modelled using techniques similar to the ones described below.

Each of the objectives described under bullet a) to d) has a weighted contribution to the cost vector $c_s$. Again, these weights may be calibrated experimentally or estimated based on real costs associated with the objectives. The objective described under bullet e) is implemented as a soft constraint and therefore does not have cost contribution on the $a_{ko}$ variables in $A_s = [a_{ko}]$ but only on the auxiliary variables of the soft constraint. Let $c_{ko} = w_a c a_{ko} + w_b c b_{ko} + w_c c c_{ko} + w_d c d_{ko}$ define the element in $C_s$ associated with variable $a_{ko}$ in $A_s$. The objectives described under bullet a) and b) can be modelled in the same way as the objectives described under bullet b) and c) in step 306 of L2A. To define $cc_{ko}$ and $cd_{ko}$ assume
 dis(k) is the discharge port of container k,
 latest(o) is the latest discharge port on board the vessel in the stack associated with position o.

We then have $cc_{ko} = \text{dis}(k) * \text{level}(o)$, $cd_{ko} = \text{dis}(k) > \text{latest}(o)$.

The objective described under bullet e) can be modelled as a soft constraint using big-M format and integer auxiliary variables as shown for the similar objective described under bullet d) in step 404 of L2B.

In the ninth step 410, L2B adds the assignment of containers to positions in storage area s given by $x_s^*$ to the stowage plan T. If s is the last storage area, L2B returns T which then is a complete stowage plan for the current port (411). Otherwise, L2B considers the next storage area by looping back to the fifth step.

Figure 8:
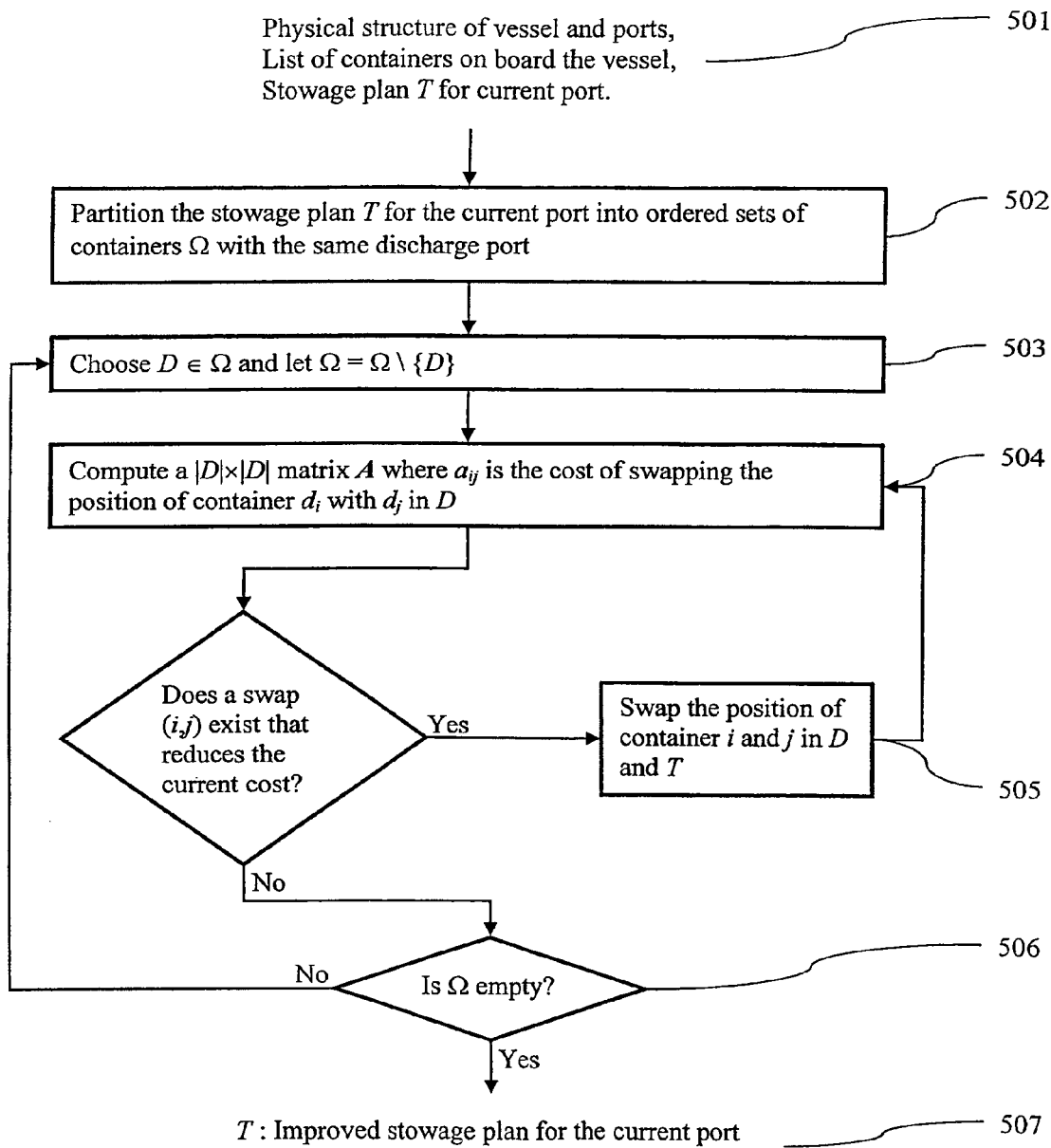
FIG. 8 shows a flow diagram of an example of the L3 stage of a method of determining an allocation plan for a cargo stowage problem.

FIG. 8 shows a flow diagram of an example of the L3 stage of a method of determining an allocation plan for a cargo stowage problem. The main input to L3 is a complete stowage plan T (e.g., generated by L2), 501. L3 is fine-grained iterative improvement optimizer that in each iteration swaps the position of a single pair of containers with same discharge port and attributes such that the altered stowage plan still satisfies the main constraints and optimization criteria of L1 and L2. The purpose of L3 is to make a post-optimization of the stowage plan where refined stability, stress, and makespan requirements are optimized.

In the first step, 502, L3 partitions the containers in the stowage plan T into a set $\Omega$ of sets of containers with same discharge port and reefer and length attributes. Thus, swapping containers within each of these partitions will not break any constraints on these attributes.

In the second step, 503, L3 removes a set D from Q.

In the third step, 504, L3 computes a $|D| \times |D|$ matrix $A = [a_{ij}]$, where $a_{ij}$ is the cost a stowage plan where the position of container $d_i$ and $d_j$ in D is swapped minus the cost of the current stowage plan. Virtual or "air" containers may also be added to D such that it is possible to swap containers to empty positions. The cost function includes a weighted sum of the following objectives
 a) Move the center of gravity to a desired location,
 b) Improve stack weight,
 c) Reduce torsion.

Further objectives or modifications of the defined objectives generally known in the container shipping industry or described in the literature can be added (e.g., improve stack height, reduce wind stack forces, to avoid undesired placement of special containers such as IMO and out-of-gauge containers). Many of these objectives may be modelled using techniques similar to the ones described below.

Assume
 G(T) is the point of gravity for the stowage plan T,
 G*(T) is the desired point of gravity for the stowage plan T,
 W(T) is the sum of unused stack weights in T, where the unused stack weight for a stack is the difference between the maximum weight of the stack and its weight in T,
 tor(T) is the torsion of the stacks in T. The torsion of a vessel stowage can be computed using standard techniques described in the literature or approximations to these,
 T(i,j) denotes stowage plan T where the containers corresponding to $d_i$ and $d_j$ in D have been swapped.

$A = [a_{ij}]$ can then formally be defined as $a_{ij} = w_a a a_{ij} + w_b a b_{ij} + w_c a c_{ij}$, where $aa_{ij} = |G(T(i,j)) - G^*(T(i,j))| - |G(T) - G^*(T)|$, $ab_{ij} = W(T(i,j)) - W(T)$, $ac_{ij} = \text{tor}(T(i,j)) \text{tor}(T)$.

The weights $w_a$, $w_b$, and $w_c$ can be calibrated experimentally or estimated from the real costs associated with the objectives.

In the fourth step, 505, L3 swaps the position of the containers in D and T with the most negative entry in A and loops back to the third step to recompute A for the new configuration of containers.

In the fifth step, 506, L3 breaks out of the iterative improvement of the positions of the containers in D because no negative entry is found in A. This indicates that a local minimum of the cost function has been found for the placement of this set of containers. If no further sets exist in the partitioning, L3 returns the resulting stowage plan for the current port, 507. Otherwise, L3 loops back to the second step and considers the next set in the partitioning.

FIG. 9 schematically illustrates a data processing system 900 for determining an allocation plan for a cargo stowage problem. The data processing system 900 includes a central server system 901 and client systems 902 at each port of a string. Even though FIG. 9 shows an example with three ports A, B, C, it will be appreciated that the system may be implemented with any suitable number of ports. The server systems 901 is connected to each of the client systems 902 via a communications network 903. The server system 901 and each of the client systems 902 may be any suitable computer or other data processing system, e.g. a PC, a workstation, a server computer, etc. It will be appreciated that some or all of the client systems may be portable computers, such as laptop computers, PDAs, and/or the like. It will further be appreciated that the server system 901 may be integrated with one of the client systems 902.

The communications network 903 may include any network or combination of networks suitable for data communications, e.g. a computer network, such as a wide area network, an internet, a virtual private network, or the like. Further examples of communications networks include telecommunications networks, such as wireless telecommunications networks.

In one embodiment, the system 900 is configured to perform the stowage planning in a centralised manner: In this embodiment, the server system 901 receives information about the containers that are scheduled to be loaded at the respective ports. For example, the server system may receive this information from the client systems 902 or from another data processing system, e.g. a logistics scheduling system. The server system then performs the L1 stage of the allocation planning as described herein and generates a preliminary distribution plan. The server system may also perform one or more of the subsequent refinement stages, e.g. the stages L2 and L3 described herein, so as to generate final allocation plans for one or more of the ports A, B, and C. The server system then communicates the stowage plan(s) via communications network 903 to the respective client systems 902, where they are used for the actual stowing of the containers onto the vessel. For example, the stowage plan may be displayed on the client system for a stowage coordinator to review or manually modify. The plan may also be loaded into an automated stowage system for the automatic scheduling of cranes and other machines in the port.

Alternatively, the server system may communicate the preliminary distribution plan generated by the L1 stage of the process described herein to the client systems. In such an embodiment, each client system may, be configured to perform one or more of the refinement stages L2 and L3.

In yet an alternative embodiment, each client system may perform the entire allocation planning process, thus avoiding the need for a central server system.

Although some embodiments have been described and shown in detail, the invention is not restricted to them, but may also be embodied in other ways within the scope of the subject matter defined in the following claims.

For example, the methods described herein have mainly been described with reference to a cyclic voyage of a vessel. However, it will be appreciated that the method described herein may also be applicable in connection with other operations of a vessel, e.g. a non-cyclic operation, or an operation where not all ports are called during each rotation.

Embodiments of the method described herein can be implemented by means of hardware comprising several distinct elements, and by means of a suitably programmed microprocessor. In the device claims enumerating several means, several of these means can be embodied by one and the same item of hardware, e.g. a suitably programmed microprocessor, one or more digital signal processor, or the like. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, integers, steps or components but does not preclude the presence or addition of one or more other features, integers, steps, components or groups thereof.

The invention claimed is:

1. A computer-implemented method for determining an allocation plan for a cargo stowage problem of allocating a set of cargo items to a set of cargo item positions of a vessel, each cargo item position being suitable for receiving a cargo item, the method comprising:
   providing an expression indicative of one or more constraints to be satisfied by said allocation plan,
   providing a cost function indicative of a cost of an updated allocation plan relative to a current allocation plan of said cargo stowage problem,
   iteratively updating a current allocation plan from an initial allocation plan to an updated allocation plan so as to decrease said cost function under said one or more constraints;
   wherein iteratively updating the current allocation plan includes iteratively updating the cost function.

2. The method according to claim 1, comprising representing said one or more constraints as a set of linear inequalities.

3. The method according to claim 1, wherein said cost function is a linear function of a variable indicative of an allocation plan.

4. The method according to claim 3, wherein said cost function is a linear approximation of a non-linear cost function.

5. The method according to claim 3, wherein an iteration of said iteratively updating a current allocation plan includes:
   computing a current linear cost function as a relative cost for changing a current allocation according to the current allocation plan to a new allocation according to a new allocation plan;
   updating the current allocation plan by a new allocation plan having a lower value of the current linear cost function.

6. The method according to claim 1, wherein iteratively updating the current allocation plan includes using a linear programming solver.

7. The method according to claim 1, wherein said allocation plan is indicative of how many cargo items of each of a set of predetermined cargo classes are allocated to each of a set of storage areas of a vessel scheduled to call a set of ports, wherein each of said storage areas comprises a subset of said set of cargo item positions.

8. The method according to claim 1, wherein at least one of said cost function and said one or more constraints includes a component/contribution indicative of a makespan for stowing said cargo items by a set of cranes.

9. The method according to claim 1, wherein the allocation plan is indicative of an allocation of cargo items at at least a first port included in a route of said vessel; and wherein the set of cargo items includes a subset of cargo items scheduled to be allocated at a subsequent port included in the route of said vessel.

10. The method according to claim 1, wherein said at least one of said cost function and said one or more constraints includes a component/contribution indicative of allocating cargo items adapted to connect to respective supply interfaces of respective cargo item positions of said vessel.

11. The method according to claim 8, wherein said allocation plan is indicative of an allocation of cargo items at at least a first port included in a route of said vessel; and wherein at least one of said cost function and said one or more constraints includes at least a set of components/contributions indicative of:
   an allocation of a subset of cargo items scheduled to be allocated at a subsequent port included in the route of said vessel,
   a makespan for stowing said cargo items by a set of cranes, and
   an allocation of cargo items adapted to connect to respective supply interfaces of respective cargo item positions of said vessel.

12. The method according to claim 1, comprising:
   a) representing instances of said allocation plan by a variable and generating an initial instance of a current plan,
   b) constructing an expression on said variable such that the expression is satisfied if and only if a plan represented by said variable satisfies the constraints of said allocation problem,
   c) constructing a cost function on said variable such that the cost function is the cost of changing said current plan to a plan represented by said variable for said allocation problem,
   d) updating said current plan to a plan represented by said variable minimizing the cost function subject to the expression,
   e) repeating items c) and d) until a predetermined termination criterion is satisfied,
   f) providing the current plan as an output.

13. A computer-implemented method for determining an allocation plan for a cargo stowage problem of allocating a set of cargo items to a set of cargo item positions of a vessel, each cargo item position being suitable for receiving a cargo item, the method comprising:
   determining a preliminary distribution plan indicative of how many cargo items of each of a set of predetermined cargo classes are to be loaded to each of a set of storage areas of a vessel, each storage area including a set of cargo item positions;
   providing said preliminary distribution plan as an input to a subsequent process for determining a refined allocation plan.

14. The method according to claim 13, further comprising determining a refined allocation plan as an at least approximate solution of an allocation problem, said refined allocation plan being indicative of an allocation of individual cargo items to respective cargo item positions, said allocation problem including a first set of constraints, said first set of constraints including the preliminary distribution plan.

15. The method according to claim 13, wherein determining the preliminary distribution plan comprises:
   providing an expression indicative of a second set of constraints to be satisfied by said preliminary distribution plan,
   providing a cost function indicative of a cost of an updated preliminary distribution plan relative to a current preliminary distribution plan;
   iteratively updating a current preliminary distribution plan from an initial preliminary distribution plan to an updated preliminary distribution plan so as to decrease said cost function under the second set of constraints.

16. The method according to claim 15, wherein iteratively updating the current preliminary distribution plan includes iteratively updating the cost function.

17. The method according to claim 15, wherein said cost function is a linear function of a variable indicative of a distribution plan.

18. The method according to claim 17, wherein said cost function is a linear approximation of a non-linear cost function.

19. The method according to claim 15, wherein an iteration of said iteratively updating a current preliminary distribution plan includes:
   computing a current linear cost function as a relative cost for changing a current distribution according to the current preliminary distribution plan to a new distribution according to a new preliminary distribution plan;
   updating the current preliminary distribution plan by a new preliminary distribution plan having a lower value of the current linear cost function.

20. The method according to claim 15, wherein iteratively updating the current preliminary distribution plan includes using a linear programming solver.

21. The method according to claim 13, wherein the preliminary distribution plan is indicative of an allocation of cargo items at a first port included in a route of said vessel; and wherein the set of cargo items includes one or more subsets of cargo items scheduled to be allocated at corresponding one or more subsequent ports included in the route of said vessel; and wherein the refined allocation plan is indicative of an allocation of a subset of cargo items scheduled to be allocated at a number of ports of said route, the number being smaller than the number of ports included in the preliminary distribution plan.

22. The method according to claim 21, wherein the refined allocation plan is indicative of an allocation of a subset of cargo items scheduled to be allocated at the first port only.

23. The method according to claim 14, wherein determining the refined allocation plan includes:
   allocating respective subsets of cargo items to corresponding respective subsets of cargo item positions;
   allocating respective cargo items of each subset of cargo items to respective cargo item positions of the corresponding subset of cargo item positions.

24. The method according to claim 23, wherein the step of allocating respective subsets of cargo items to corresponding respective subsets of cargo item positions includes computing and allocating said subsets of cargo items according to a predetermined rule; and wherein the step of allocating respective cargo items of each subset of cargo items to respective cargo item positions of the corresponding subset of cargo item positions includes computing an at least approximate solution of a linear assignment problem.

25. The method according to claim 23, further comprising:
   a) constructing a list W including the cargo items to be loaded in said vessel,
   b) constructing a data structure for representing a current allocation plan T and initializing T to an empty allocation plan,
   c) removing a sub-list of cargo items K' from said list W of cargo items, d) constructing a list $O_{K'}$ of possible cargo item positions for said list of cargo items K' on said vessel such that $O_{K'}$ does not include any positions in said current allocation plan T, occupied by cargo items already onboard said vessel, or violating a set of predetermined placement constraints on said list of cargo items K', e) computing an allocation of said list of cargo items K' to said list of cargo item positions $O_{K'}$ that minimizes at least approximately a total sum of a cost for assigning each cargo item in K' to exactly one position in $O_{K'}$ such that no position in $O_{K'}$ is assigned to more than one cargo item in K', f) adding the said allocation computed in step vi to said current allocation plan T, g) repeating steps c) through f) until said list W of cargo is empty, whereby T includes the final allocation plan.

26. The method according to claim 25, wherein said allocation of said list of cargo items K' to said list of positions $O_{K'}$ that minimizes said total sum of costs is computed by solving at least approximately a linear assignment problem.

27. The method according to claim 25, wherein the sub-lists of said list of cargo items W are sorted according to a predetermined priority assigned to each sub-list.

28. The method according to claim 25, wherein said placement constraints on said sub-list of cargo items K' includes an upper bound on the number of cargo items of each cargo class in said set of cargo classes for each storage area in a set of storage areas of said vessel where each storage area comprises a set of cargo item positions.

29. The method according to claim 14, wherein determining the refined allocation plan includes:
   allocating respective cargo items to corresponding respective storage areas;
   allocating each allocated cargo item to a cargo item position of said storage area.

30. The method according to claim 29, wherein each of the steps of allocating respective cargo items to corresponding respective storage areas and of allocating each allocated cargo item to a cargo item position of said storage area includes computing an at least approximate solution of a corresponding linear assignment problem.

31. The method according to claim 30, wherein allocating respective cargo items to corresponding respective storage areas includes computing an at least approximate solution of a corresponding linear assignment problem under the first set of constraints including the preliminary distribution plan.

32. The method according to claim 29, wherein allocating each allocated cargo item to a cargo item position of said storage area, includes computing respective at least approximate solutions of a number of mutually independent linear assignment problems, each of the mutually independent linear assignment problems corresponding to a respective one of the storage areas.

33. The method according to claim 29, wherein allocating respective cargo items to corresponding respective storage areas comprises:
   providing a first data structure indicative of an allocation of each of a set of cargo items to respective storage areas;
   providing a first expression indicative of a first set of constraints to be satisfied by said allocation of cargo items to storage areas;
   providing a first cost function as a function of at least said first data structure and indicative of a cost of said allocation of cargo items to storage areas;
   determining an at least approximate solution of an optimization problem of optimizing said first cost function under said first set of constraints.

34. The method according to claim 33, wherein the first cost function includes a penalty contribution indicative of at least one of the following:
   a failure to load all cargo items scheduled to be loaded at a current port,
   a failure to load a number of cargo items of each of a set of cargo classes determined by said preliminary distribution plan to be loaded in each storage area,
   an allocation of more high-cube cargo items in a storage area under deck than corresponding to an amount of space in that storage area.

35. The method according to claim 33, wherein allocating each allocated cargo item to a cargo item position of said storage area comprises for each storage area:
   providing a second data structure indicative of an allocation to cargo item positions of each of a subset of cargo items allocated to said storage area;
   providing a second expression indicative of a second set of constraints to be satisfied by said allocation of cargo items to cargo item positions;
   providing a second cost function as a function of at least said second data structure and indicative of a cost of said allocation of cargo items to cargo item positions;
   determining an at least approximate solution of an optimization problem of optimizing said second cost function under said second set of constraints.

36. The method according to claim 35, wherein the second cost function includes a cost contribution indicative of at least one of the following objectives:
   allocating cargo items to stacks of cargo item positions so as to occupy cargo item positions in each stack in a bottom-to-top order;
   allocating heavier cargo items more proximate to a bottom of a stack of cargo item positions than lighter cargo items;
   allocating cargo items having an earlier discharge port more proximate to a bottom of a stack of cargo item positions than cargo items having later discharge port;
   penalising overstow of a previously loaded container in a stack;
   penalising an allocation of more high-cube cargo items in a storage area under deck than corresponding to an amount of space in that storage area.

37. The method according to claim 14, further comprising computing a further refined allocation plan from said refined allocation plan by iteratively swapping pairs of cargo items within a data structure representative of the refined allocation plan so as to produce respective alternative allocation plans, and by selecting a further refined allocation as one of the alternative allocation plans with a decreased value of a predetermined cost function relative to the refined allocation plan.

38. The method according to claim 14, comprising representing said first set of constraints as a set of linear inequalities.

39. The method according to claim 15, wherein at least one of said cost function and said second set of constraints includes a component/contribution indicative of a makespan for stowing said cargo items by a set of cranes.

40. The method according to claim 14, wherein the preliminary distribution plan is indicative of an allocation of cargo items at at least a first port included in a route of said vessel; and wherein the set of cargo items includes a subset of cargo items scheduled to be allocated at a subsequent port included in the route of said vessel.

41. The method according to claim 15, wherein said at least one of said cost function and said second set of constraints includes a component/contribution indicative of allocating cargo items adapted to connect to respective supply interfaces of respective cargo item positions of said vessel.

42. The method according to claim 41, wherein said preliminary distribution plan is indicative of an allocation of cargo items at at least a first port included in a route of said vessel; and wherein at least one of said cost function and said second set of constraints includes at least a set of components/contributions indicative of:
  an allocation of a subset of cargo items scheduled to be allocated at a subsequent port included in the route of said vessel,
  a makespan for stowing said cargo items by a set of cranes, and
  an allocation of cargo items adapted to connect to respective supply interfaces of respective cargo item positions of said vessel.

43. A computer-implemented method for generating a refined allocation plan from an input allocation plan for a vessel, the method comprising:
  providing a data structure for representing a current allocation plan, the current allocation plan being indicative of an allocation of a plurality of cargo items to respective cargo item positions of said vessel, and initializing the data structure to said input allocation plan;
  computing a refined allocation plan by iteratively swapping the allocated positions of respective pairs of cargo items in said data structure to produce respective alternative allocation plans, and by selecting a refined allocation plan as one of the alternative allocation plans with a decreased value of a predetermined cost function relative to the current allocation plan.

44. The method according to claim 43, wherein the step of computing a refined allocation plan includes:
  a) constructing a set of alternative allocation plans by swapping the position of respective single pairs of cargo items for each distinct pair of cargo items in said current allocation plan,
  b) selecting an updated allocation plan with a minimum cost from said set of alternative allocation plans,
  c) updating said current allocation plan to said updated allocation plan if the cost of the selected updated allocation plan is lower than the cost of the current allocation plan; and
  e) repeating the steps a), b), and c) until a predetermined termination criterion is fulfilled.

45. The method according to claim 44, wherein repeating the steps a), b), and c) includes repeating the steps a), b), and c) as long as said selected updated allocation plan has a lower cost than said current allocation plan.

46. The method according to claim 43, wherein computing a refined allocation plan includes computing respective refined sub-allocation plans by swapping cargo items within each corresponding sub-allocation plan; wherein each sub-allocation plan is indicative of the allocation of a corresponding sub-set of cargo items.

47. The method according to claim 43, wherein said predetermined cost function includes at least one component/contribution indicative of at least one of a stability requirement for the vessel, physical stress imposed on the vessel, and a makespan requirement.

48. A method of stowing cargo items at each of a set of cargo item positions of a vessel scheduled to call a set of ports, the method including
  determining an allocation plan by performing the steps of the method according to claim 1;
  arranging the set of cargo items onto the vessel in accordance with the determined allocation plan, resulting in a vessel having stowed thereon the set of cargo items.

49. A computer program product comprising program code means adapted to cause a data processing system to perform the steps of the method according to claim 1, when said program code means are executed on the data processing system.

50. A data processing system configured to perform the steps of the method according to claim 1.

* * * * *